G. W. FERDON.
PORTABLE COOKED FOOD HEAT RETAINING SERVITOR.
APPLICATION FILED FEB. 13, 1919.

1,324,653.

Patented Dec. 9, 1919.
2 SHEETS—SHEET 1.

Inventor:
Guy W. Ferdon.
by Charles C. Stauffer
Attorney

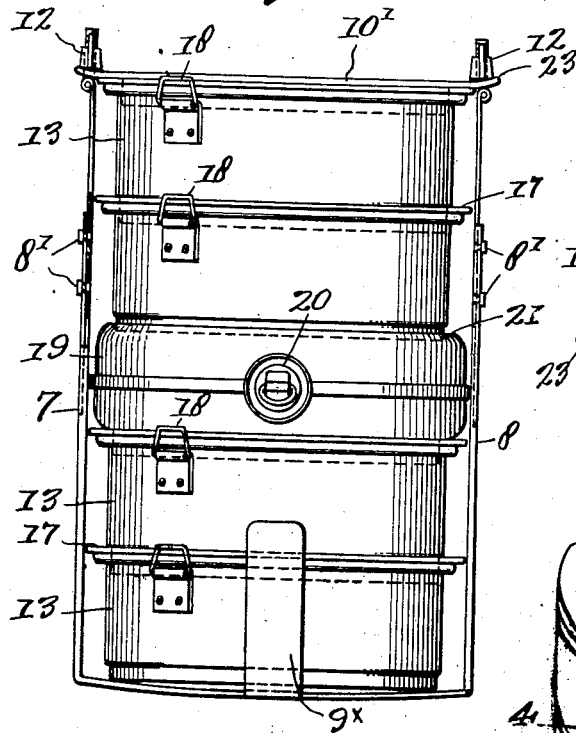
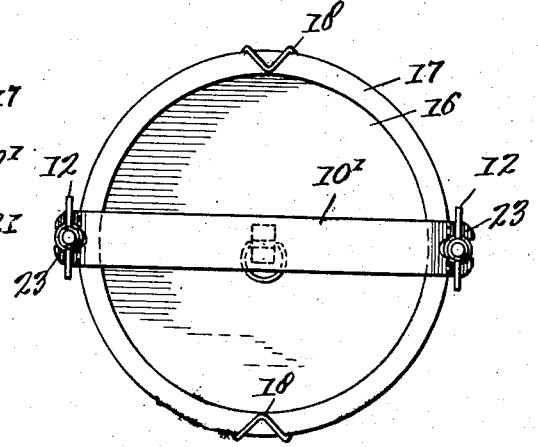
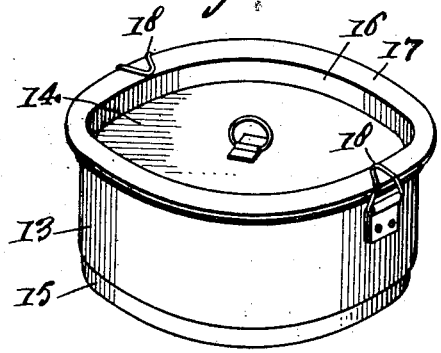
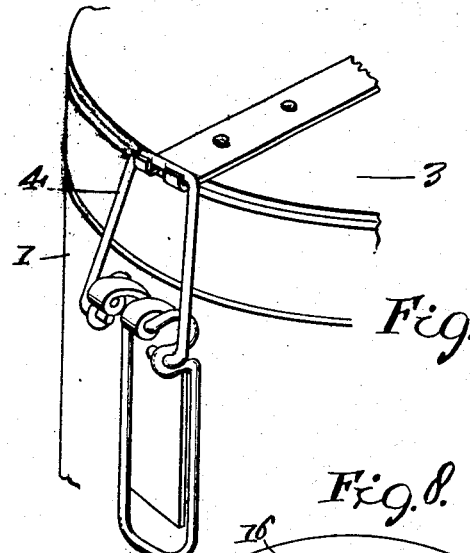
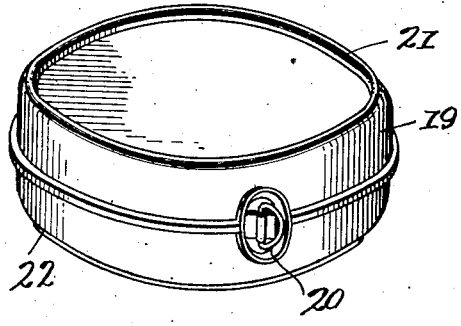
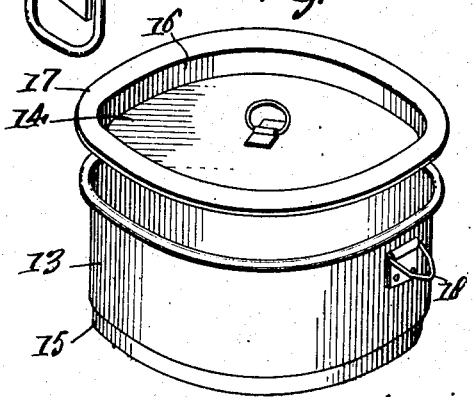

UNITED STATES PATENT OFFICE.

GUY W. FERDON, OF CRESKILL, NEW JERSEY.

PORTABLE COOKED-FOOD HEAT-RETAINING SERVITOR.

1,324,653.　　　　　Specification of Letters Patent.　　　Patented Dec. 9, 1919.

Application filed February 13, 1919. Serial No. 276,748.

*To all whom it may concern:*

Be it known that I, GUY W. FERDON, a citizen of the United States, residing at Creskill, county of Bergen, State of New Jersey, have invented certain new and useful Improvements in Portable Cooked-Food Heat-Retaining Servitors; and I do hereby declare the following to be a full, clear, and exact description of the invention, such as will enable others skilled in the art to which it appertains to make and use the same.

My invention is a portable cooked food heat retaining servitor and relates to a device for maintaining the several components of a cooked family meal, when sent from a central station or delivery point, separate from each other and warm for several hours, in such condition that the food may be served expeditiously and attractively.

It is well known that food, at least food of many kinds, if cooked in large quantities can be cooked with great economy of fuel and service, and with the added advantage that the flavor and aroma of the food are better preserved than when the same food is cooked in small quantities.

As an illustration attention is called to the fact that roast beef when cooked in large roasts of fifty or sixty pounds is much better flavored and is much more economically cooked than when cooked in a small family roast of four to eight pounds.

Also it is well known that economy of labor and service attendant upon the preparation and cooking of food is much enhanced when food is cooked in large quantities and served from a central point or depot. It is for this reason that food is often cooked and served from central stations. It is desirable in sending out meals to separate families, widely distributed through a considerable district, that means for keeping the various components of a meal hot and savory without overcooking them, be supplied.

My present invention relates to means whereby this may be effected. It is obvious that certain foods will cool more quickly than other foods so that certain portions of the meal are liable to be cold when the meal is served, while the others may still be warm or hot. Thus, the meat portion of a dinner such as I have referred to, is liable to cool first and while the soup portion, if soup be served, may keep hot the meat portion may be congealed and unpalatable. I aim to overcome these difficulties as above indicated.

In the drawings—

Fig. 3 is a perspective showing my rack and stack of dishes.

Fig. 4 is a perspective of one of the dishes or containers.

Fig. 5 is a perspective of my flask or liquid container.

Fig. 6 is a top view of my stack and rack.

Fig. 7 is a detail showing a clamp on my casing, and

Fig. 8 is a perspective corresponding to Fig. 4 showing a container with the top removed and the holding clips thrown back.

Figure 1:
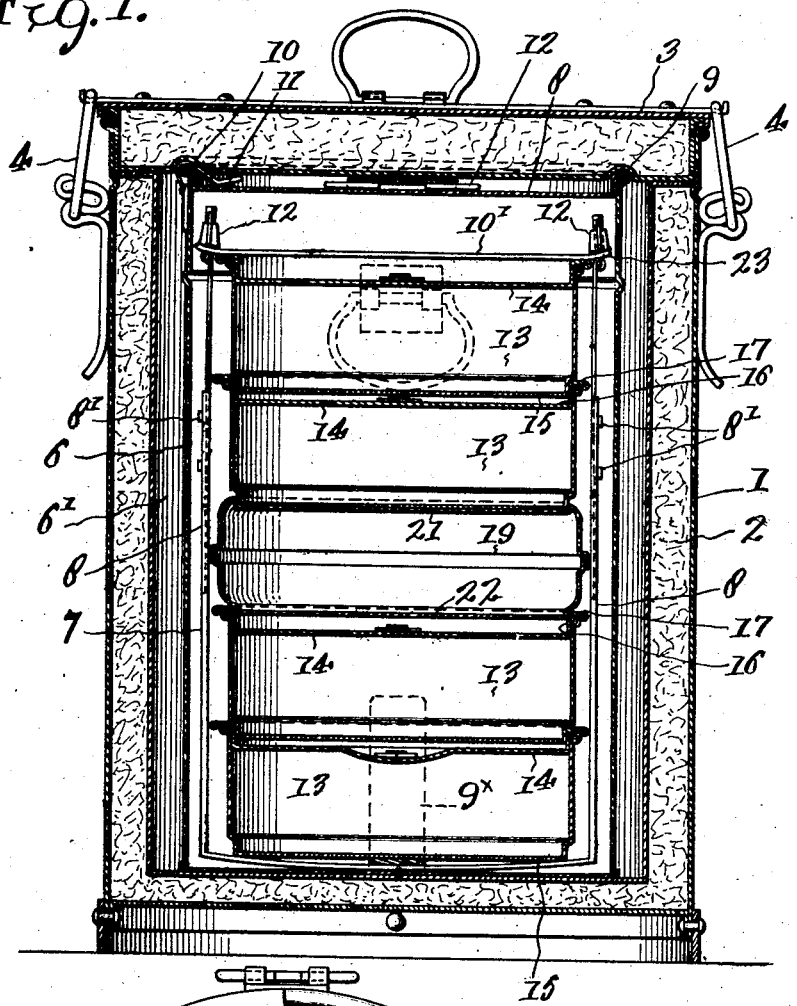
Figure 1 is a vertical section of my device.
Figure 2:
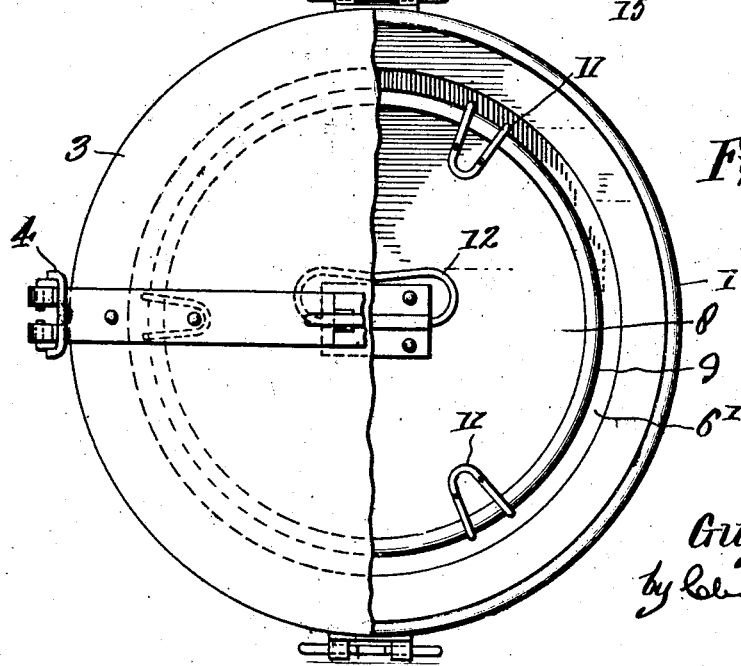
Fig. 2 is a plan partly in section.

I provide a casing 1 having inner and outer walls and between them a layer of heat insulating material 2. I provide a similarly constructed lid 3 and clamping means 4 for holding the lid and casing in place. It will thus be seen that I have provided an interior space 6', heat insulated from the outside air. For this space I may provide a receptacle 6 preferably adapted in dimensions to fit within the space though not necessarily contacting with the walls of the space or spacing chamber. This receptacle preferably has inside it a rack 7. The receptacle is also preferably provided with a cover 8 and this cover has a flange 9 which I may extend up a little above the upper edge of the casing and which is adapted to be engaged by groove 10 in the cover for the casing, as shown in Fig. 1. This serves to hold the receptacle in place in the casing though in some cases I may omit the groove and flange, one or both. The lids of both the casing and receptacle are provided with the usual handles, and on the receptacle I provide a series of bolts 11 which are hinged to the sides of the receptacle and which may be thrown over to hold the lid of the receptacle in place so that it can be lifted out of the casing by means of the handle 12. The rack 7 is composed of two long spring arms 8ˣ, as shown, and two shorter arms 9ˣ. This rack is of suitable dimensions to go easily inside the receptacle and the longer arms 8 are drawn or held together at the top by a bar 10', said bar being slotted to receive the bolts 11 hinged one on each of said longer arms 8 at the top and provided with the thumb nuts 12 so that the said arms may be secured in more or less adjusted distances. The long arms 8ˣ are preferably made adjustable by means of bolts 8' and slots for suitable adjustment to the height of any desired stack of dishes as indicated below.

I provide a series of dishes or containers 13, shown in Figs. 4 and 8, for holding the various articles of food separate, and each of these containers has a lid 14. Each container is made with an inset or shoulder 15 at the bottom and each cover or lid is made with a depressed portion 16 and a flange 17. The shoulder 15 of each receptacle fits snugly into the depressed portion 16 of any lid though without extending to the bottom of said depressed portion so that there is always an air space between the bottom of a dish and the main or flat portion of the cover next below it.

The flange 17 serves to support the lid in fixed position with reference to the dishes, and also serves as a place with which the clips 18 on the side of each dish may engage. These clips when bent over, hold the lid firmly down in place and they are made just long enough to reach near to the inner part of said flange so as to help to position the receptacle or dish next above by engaging with the sides or walls of said dish. I provide a series of these dishes or receptacles all interchangeable, and as here shown, of the same size, although the vertical dimensions may of course vary. The lids of the dishes may be used, if desired, as service dishes or as individual plates.

These dishes are intended to be placed in a stack within the rack, and, as one of the members of this stack, I preferably provide a flask 19, shown in Fig. 5. This flask has a filling opening indicated at 20 and is paneled on its sides that is, provided with a shoulder 21 and a depression 22 like the features 15 and 16 of the container above, but shallower. This flask may be of any suitable height and may correspond in height to one of the dishes. It is intended to be filled with a heat retaining medium, say hot water, salt, a saturated solution of sodium hyposulfite, or other salt, or it may be, with liquids like coffee or cocoa. The depressed portions of the lids, the shouldered bottoms and the panels of the flasks are all of practically the same dimensions so that they are all interfitting. A lid may fit into a flask or into another lid, and into a dish or receptacle as well. They are all interchangeable and have nesting parts; each unit of the series, that is each dish, each lid and each flask may be said to have a projection and a depression all of the same size so that they interfit, in any relation. For ease in fitting and to accommodate the thickness of the metal, a slight bevel should be given in each instance. In placing the dishes in the rack so as to form the stack, the flask may be placed next to and preferably just below that dish or container which contains the food most likely to cool off first, say that one containing slices of meat or fowl. By having the depression 22 shallow it will be seen that the shoulder 15 of the dish above it comes in contact with the bottom of said depression and if the flask be full, receives the heat from the contents of the flask and is thus kept warm. In table service too, the flask may be used to keep a particular dish warm, such dish being placed directly upon the flask and if more than one flask be used of course several dishes, or if desired, individual plates or lids used as such may thus be kept warm.

By having the arms 7 of the rack elastic and capable of being drawn together I am enabled to clamp the stack of dishes and flask of which more than one may be provided, if desired, into a firm compact whole in which each unit of the stack is held firmly in place and the stack and rack may be carried by the bar 10', above referred to serving as a handle. It will be observed that the slotted ends of said bar 10' are curved a little. This aids in holding the bar and the sides of the rack in place. This curve is indicated at 23. This rack also serves to keep the bottom dish or container off from the bottom of the receptacle to a certain extent from which it is thus partially at least air insulated. The arms 9 extend about as high as a dish and help to hold the first one.

It will be seen that I may thus have inside a heat insulated casing, a receptacle, the walls of which are air spaced from the walls of the inner part of the container, a rack inside the receptacle and holding a stack of dishes all insulated from the receptacle by an air space, and also by an air space insulated from each other. Sometimes I may omit one or more of these, such as the receptacle. However, by means, in whole or in part, of this series of successive insulations as well as by the flask 21 for supplying heat for warming purposes I am enabled to keep previously cooked food warm for a period extending far beyond the ordinary requirements of service. It is to be observed that this flask or hot water bottle which I provide in the present relation, together with the dishes or containers of peculiar structure which I have indicated serve, it is intended, to keep food warm or hot as distinguished from further cooking. Food when put into the dishes that I have referred to is assumed to be already completely cooked. Further cooking would serve merely to overcook or spoil it. I keep it warm or hot, savory and palatable without further cooking.

In the preparation of a number of my devices for service, successive portions of food are served into the proper dishes, the flasks are filled and each stack built up as desired with the proper portions for two, three or four people or more, as the case may be, the bar 10' put in place and secured in place. Each stack thus built up is ready to be put into its proper container. If for any reason, this cannot be done at once, the stacks, as a whole, may be kept warm over a stove, in an oven or steam chest, as may be desired, and when ready for transportation each may be lifted out, placed in a container, the container lid fastened, the container placed in the casing, the casing lid fastened with the groove of the lid, if such a groove be used, engaging the flange of the receptacle and these casings immediately loaded upon the truck or wagon for delivery at the homes of customers. I may have as many dishes and flasks as I please.

It will thus be seen that I have invented a useful and efficient device for the service and distribution of cooked food from central kitchens.

Having thus described my invention what I claim as new and desire to secure by Letters Patent is—

1. In a portable cooked food heat retaining servitor, in combination, a casing open only at the top having a heat insulated inner wall, a heat insulating top for said casing, a receptacle for said casing, a cover for said receptacle, a rack fitting inside said receptacle, said rack being open at the top, a series of dishes adapted to said rack, each said dish nesting at the bottom in the top of the one next below it, and means to secure said dishes within the rack, said securing means also forming a carrying handle for the rack.

2. In a portable cooked food heat retaining servitor, in combination, a heat insulating casing and cover, a receptacle adapted to said casing, a rack fitting in said receptacle, dishes adapted to said rack, interchangeable and interfitting covers for said dishes, and means extending across the top of the said rack to hold the dishes in place and also serve as a means whereby they may be lifted into and out of the casing.

3. In a portable cooked food heat retaining servitor, in combination, a heat insulating casing and cover, a receptacle adapted to fit within said casing, a rack having two longer and two shorter arms adapted to fit within the receptacle, dishes adapted to fit within the rack, said dishes being arranged to be interchangeably engaged with each other, and a bar adapted to extend between the longer arms at their ends, to hold them together and the dishes in place and serve to lift them from the receptacle and casing.

4. In a portable cooked food heat retaining servitor, in combination, a rack having two longer and two shorter arms, a set of food containers or dishes adapted to fit within said rack, a lid for each of said dishes, the bottom of each dish being adapted to fit within a part of the lid of the dish below it but without extending to touch the surface of said lower lid, the arms of said rack being elastic, and means adapted to draw together the upper ends of the two longer elastic arms and hold them clamped upon the dishes.

5. In a portable cooked food heat retaining servitor, in combination, a rack having longer and shorter arms, a set of covered dishes, each about the height of the shorter arms, a depressed lid for each, each dish being contracted at its bottom to form a shoulder with a downwardly projecting part, said downwardly projecting part being adapted to fit the depression of a lid, the depression being deeper than the projection whereby there is always an air space between the bottom of a dish and the lid into which said bottoms may be fitted, a flask, paneled on its sides, to receive a projection and to fit a depression of a dish, and a bar for holding the longer arms together.

6. In a portable cooked food heat retaining servitor, in combination, a series of dishes, lids for said dishes, said lids having flanges to support them on the edges of said dishes and being depressed within the dishes, the bottoms of the dishes having shoulders and downwardly projecting parts adapted to fit depressed lids, and clips on the sides of the dishes adapted to be turned over the lid flanges so as to hold said lid without interfering with the fitting of a bottom projection.

7. In a portable cooked food heat retaining servitor, in combination, a series of similar dishes and similar lids, so made that the bottom of each dish fits into each lid, each lid being provided with a flange and each said bottom being provided with a shoulder adapted to rest upon the flange, and a flask adapted in dimensions to the dishes and lids, and provided with a flange and shoulder.

8. In a portable cooked food heat retaining servitor, a series of interchangeable units, each consisting of a dish having a shouldered bottom, a depressed lid into which such a bottom may fit without contacting with the depressed part, a flange for supporting a lid, and clips for engaging said flange and a rack.

9. In a portable cooked food heat retaining servitor, in combination, a series of interchangeable warming and food retaining elements, the food retaining elements being provided with shouldered bottoms and the tops with corresponding flanges and depressed portions, the warming elements being provided with depressions and shouldered portions adapted to interfit with the others.

10. In a portable cooked food heat retaining servitor, in combination, a series of interchangeable units, some of said units having removable top covers, and some being provided with side openings, all of said units being provided with similar projections and depressions whereby they may be locked together, one to another.

11. In a portable cooked food heat retaining servitor, in combination, a series of dishes provided with interengaging means, a warming flask provided with means whereby it may be made to engage any one of said dishes, or be engaged thereby, dish interchangeable lids for said dishes, a rack for holding the dishes and flask when interengaged, and a bar for closing the end of the rack.

12. In a portable cooked food heat retaining servitor, in combination, a rack or frame having upwardly extending spring arms, fastening devices in the ends of said arms, and a bar slotted at the ends adapted to be engaged by said fastening devices passing through slots, and a set of mutually engaging interchangeable containers adapted in dimensions to said rack whereby when the containers are in place and the arms engaged by said bar, the containers may be held by said arms and bar.

13. In a portable cooked food heat retaining servitor, in combination, a casing open only at the top having inner and outer walls, and heat insulating material between said walls, a lid and fastener for said casing, a receptacle adapted to fit within the inner walls of said casing, a lid for said receptacle, said lid having a flange adapted to be engaged by the lid of the casing, clips for holding the lid of the container in place, a rack adapted to the inside of the container, said rack having means for holding together and supporting a stack of mutually engaging food or liquid holders, and said stack of food or liquid holders, said holding means constituting lifting means for the rack.

14. In a portable cooked food heat retaining servitor, in combination, a casing, a receptacle, a frame adapted to go within said receptacle, and a series of dishes, each of said dishes having perpendicular side walls and a shouldered bottom, each dish having a flanged depressed lid, into which depression the shouldered bottom of another dish may go part way so that each dish may have its bottom engage the lid but not go to the bottom of the depression of another dish, clips on the sides of each dish adapted to be folded over the flange of the lid to hold it down, said clips extending far enough to reach to the sides of and to assist in supporting the dish next above.

15. In a portable cooked food heat retaining servitor, in combination, a series of interchangeable warming elements, and food retaining elements, the food retaining elements being provided with shouldered bottoms and with tops having flanged and depressed portions, the said bottoms and depressed portions being of substantially the same size, and each warming element being provided with a panel or recess into which either may fit without contacting on their flat surfaces.

16. In a portable cooked food heat retaining servitor, in combination, a series consisting of warming elements, food retaining elements, and lids therefor, said warming elements, food retaining elements, and lids, all having interchangeable nesting parts, whereby they may be stacked in any desired relation, there being a space between each part and the nested in part.

17. In a portable cooked food heat retaining servitor, in combination, a series of units, said series embracing warming flasks, food containers and serving lids, all provided with projections and depressions slightly beveled and of substantially the same size whereby they may be stacked in any desired relation, there being a space between each part and the nested in part.

18. In a portable cooked food heat retaining servitor, in combination, a series of units adapted to form a stack, said series embracing warming flasks, food containers and serving lids for the containers, all provided with interfitting parts of the same lateral dimensions whereby they are all interchangeable to any extent and number, an elastic sided rack adapted to contact with the units of a stack and to support the stack, and a bar adapted to hold together the upper ends of the rack to contact with and hold the uppermost unit of the stack and to form a handle.

In testimony whereof I affix my signature.

GUY W. FERDON.